(12) United States Patent
Vasseur

(10) Patent No.: US 11,533,252 B2
(45) Date of Patent: Dec. 20, 2022

(54) REPLACING STATIC ROUTING METRICS WITH PROBABILISTIC MODELS

(71) Applicant: Cisco Technology, Inc., San Jose, CA (US)

(72) Inventor: Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/181,471

(22) Filed: Feb. 22, 2021

(65) Prior Publication Data

US 2022/0272029 A1    Aug. 25, 2022

(51) Int. Cl.
*H04L 45/24* (2022.01)
*H04L 45/02* (2022.01)
*H04L 45/302* (2022.01)
*H04L 45/42* (2022.01)
*H04L 45/12* (2022.01)

(52) U.S. Cl.
CPC .............. *H04L 45/24* (2013.01); *H04L 45/02* (2013.01); *H04L 45/123* (2013.01); *H04L 45/302* (2013.01); *H04L 45/42* (2013.01)

(58) Field of Classification Search
CPC ....... H04L 45/02; H04L 45/123; H04L 45/24; H04L 45/302; H04L 45/42
See application file for complete search history.

(56) References Cited

U.S. PATENT DOCUMENTS

| | | | |
|---|---|---|---|
| 7,693,064 B2 | 4/2010 | Thubert et al. | |
| 7,924,722 B2 | 4/2011 | Thubert et al. | |
| 10,062,036 B2 | 8/2018 | Mermoud et al. | |
| 10,798,008 B2 | 10/2020 | Karthikeyan et al. | |
| 2009/0018847 A1* | 1/2009 | Vanbeck | G06Q 10/067 705/348 |
| 2010/0130170 A1* | 5/2010 | Liu | H04W 36/0022 455/418 |
| 2014/0317276 A1* | 10/2014 | Tie | H04L 45/306 709/224 |
| 2015/0295856 A1* | 10/2015 | Karthikeyan | H04L 47/726 370/230 |
| 2016/0226742 A1* | 8/2016 | Apathotharanan | H04L 45/64 |
| 2019/0182124 A1* | 6/2019 | Jeuk | H04L 45/124 |
| 2019/0319872 A1 | 10/2019 | Adhikari et al. | |
| 2020/0021516 A1 | 1/2020 | Bajaj | |
| 2020/0184494 A1* | 6/2020 | Joseph | G06K 9/6256 |
| 2020/0313979 A1* | 10/2020 | Kumaran | H04L 41/16 |
| 2020/0382387 A1 | 12/2020 | Pasupathy et al. | |
| 2020/0389383 A1* | 12/2020 | Vasseur | H04L 43/103 |
| 2021/0303986 A1* | 9/2021 | Saha | G06F 16/285 |
| 2022/0121773 A1* | 4/2022 | Obaidi | G06F 21/6245 |

* cited by examiner

*Primary Examiner* — Jeong S Park
(74) *Attorney, Agent, or Firm* — Behmke Innovation Group LLC; Kenneth J. Heywood; Jonathon P. Western

(57) ABSTRACT

In one embodiment, a device obtains a predictive model that predicts a behavior of a path in a network. The device computes, based in part on the predictive model, a route in the network that includes the path, in accordance with a routing policy that instructs the device to use the predictive model as an attribute of the path during computation of the route. The device validates that the path exhibited the behavior predicted by the predictive model. The device initiates retraining of the predictive model, when the behavior predicted by the predictive model does not match the behavior of the path.

16 Claims, 10 Drawing Sheets

REPLACING STATIC ROUTING METRICS WITH PROBABILISTIC MODELS

TECHNICAL FIELD

The present disclosure relates generally to computer networks, and, more particularly, to replacing static routing metrics with probabilistic models.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

Failure detection in a network has traditionally been reactive, meaning that the failure must first be detected before rerouting the traffic along a secondary (backup) path. In general, failure detection leverages either explicit signaling from the lower network layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exists.

Today, routing decisions in SD-WANs and traditional networks rely on static metrics, such as Interior Gateway Protocol (IGP) link costs. In turn, probing is used periodically, to verify that a selected route remains the optimal selection. In cases in which the behavior of the route has changed, this means that the traffic may experience reduced Quality of Service (QoS) in the meantime.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
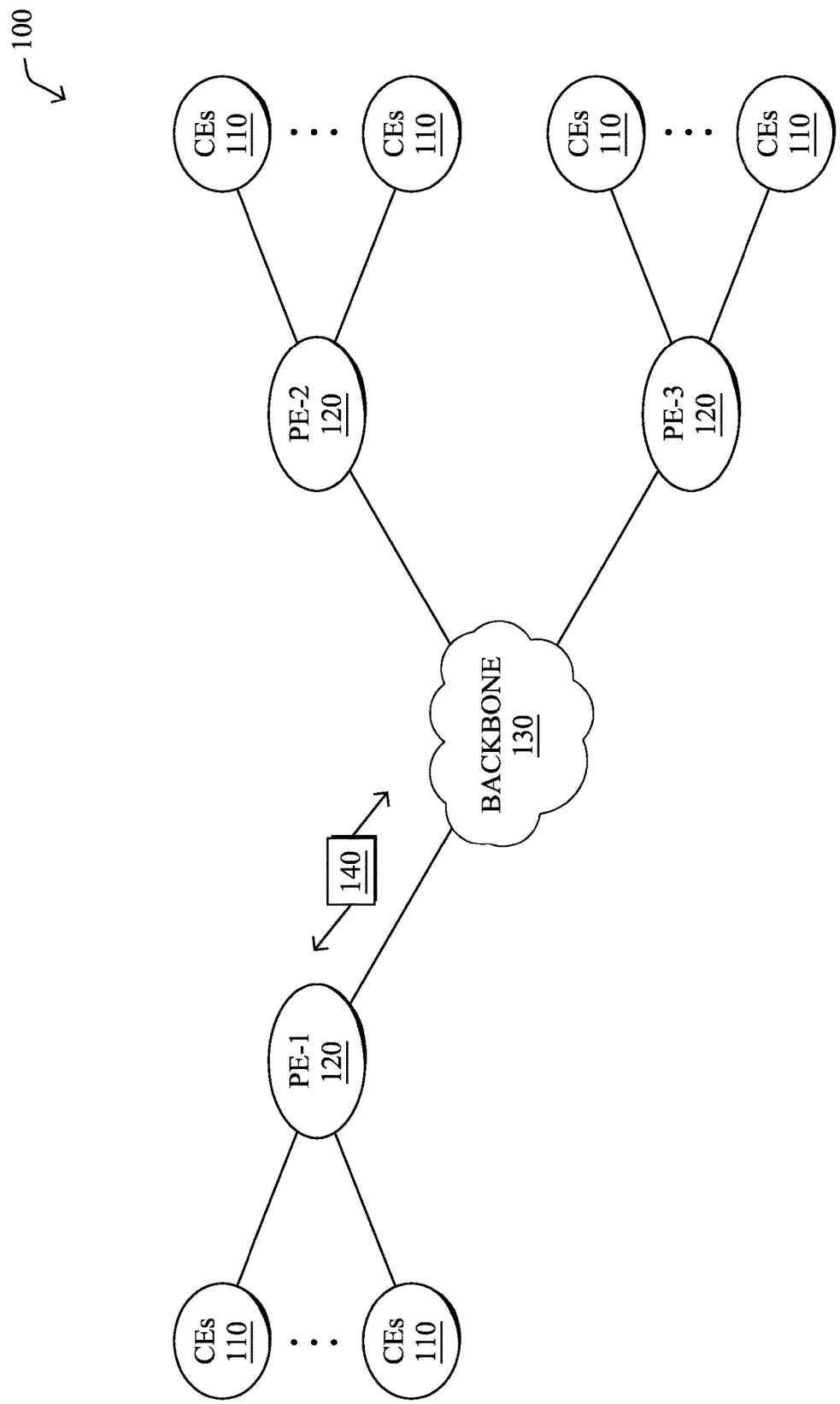
FIGS. 1A-1B illustrate an example communication network.

According to one or more embodiments of the disclosure, a device obtains a predictive model that predicts a behavior of a path in a network. The device computes, based in part on the predictive model, a route in the network that includes the path, in accordance with a routing policy that instructs the device to use the predictive model as an attribute of the path during computation of the route. The device validates that the path exhibited the behavior predicted by the predictive model. The device initiates retraining of the predictive model, when the behavior predicted by the predictive model does not match the behavior of the path.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
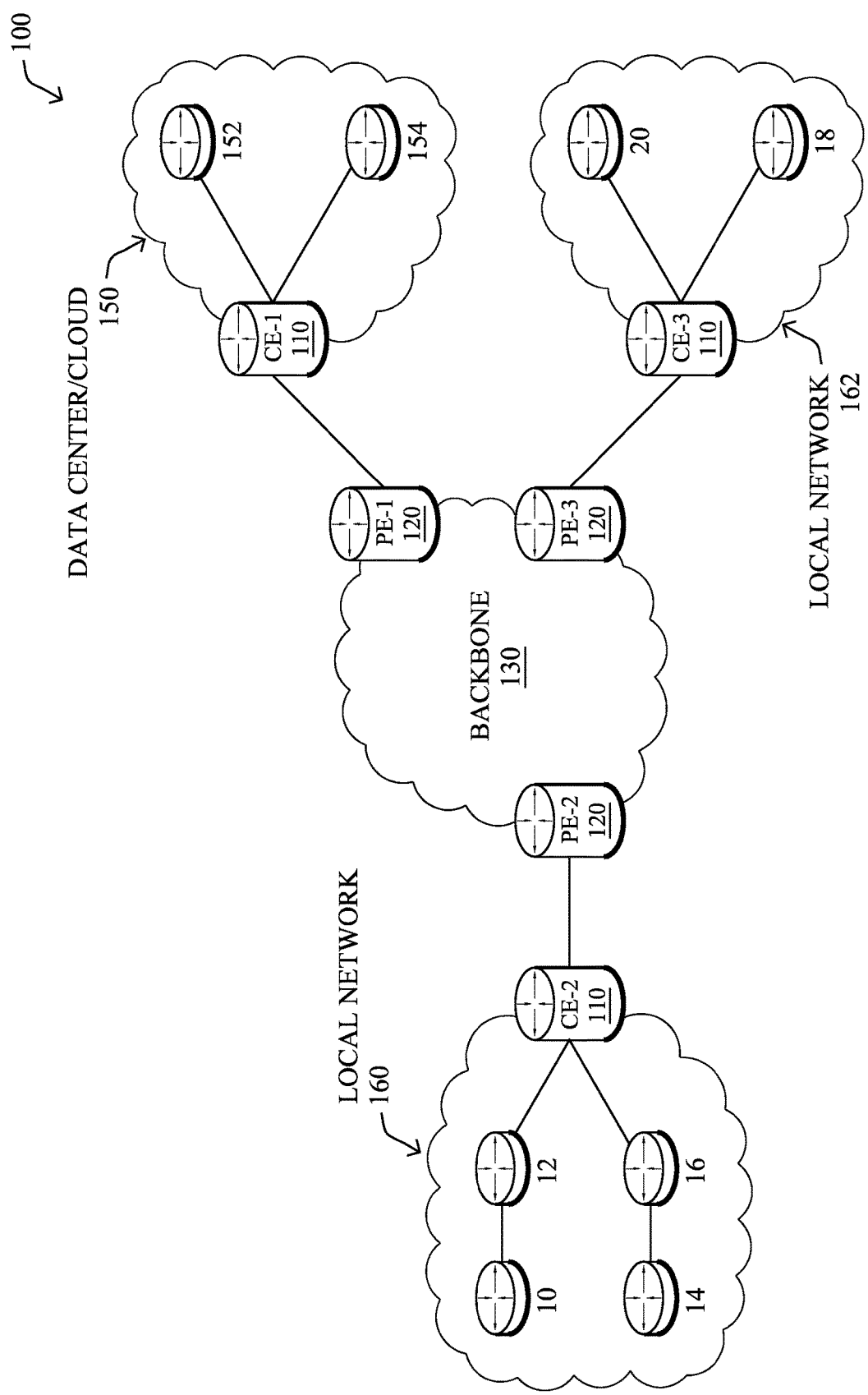

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
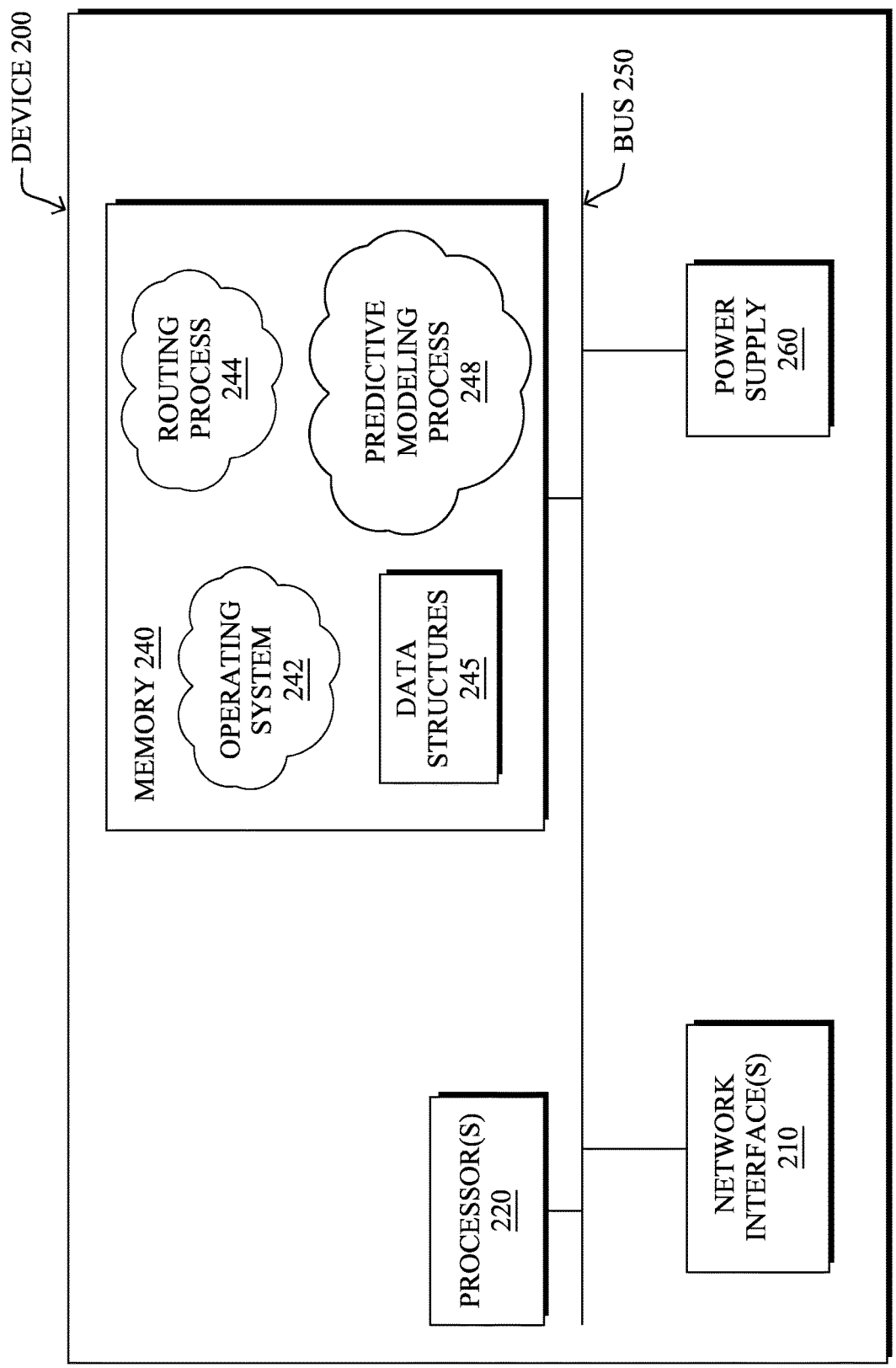
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a predictive modeling process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or predictive modeling process 248 may also include computer executable instructions that, when executed by processor(s) 220, cause device 200 to perform the techniques described herein. To do so, in some embodiments, routing process 244 and/or predictive modeling process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or predictive modeling process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable QoS or an unacceptable QoS. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or predictive modeling process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that QoS of a particular network path will not satisfy the service level agreement (SLA) of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
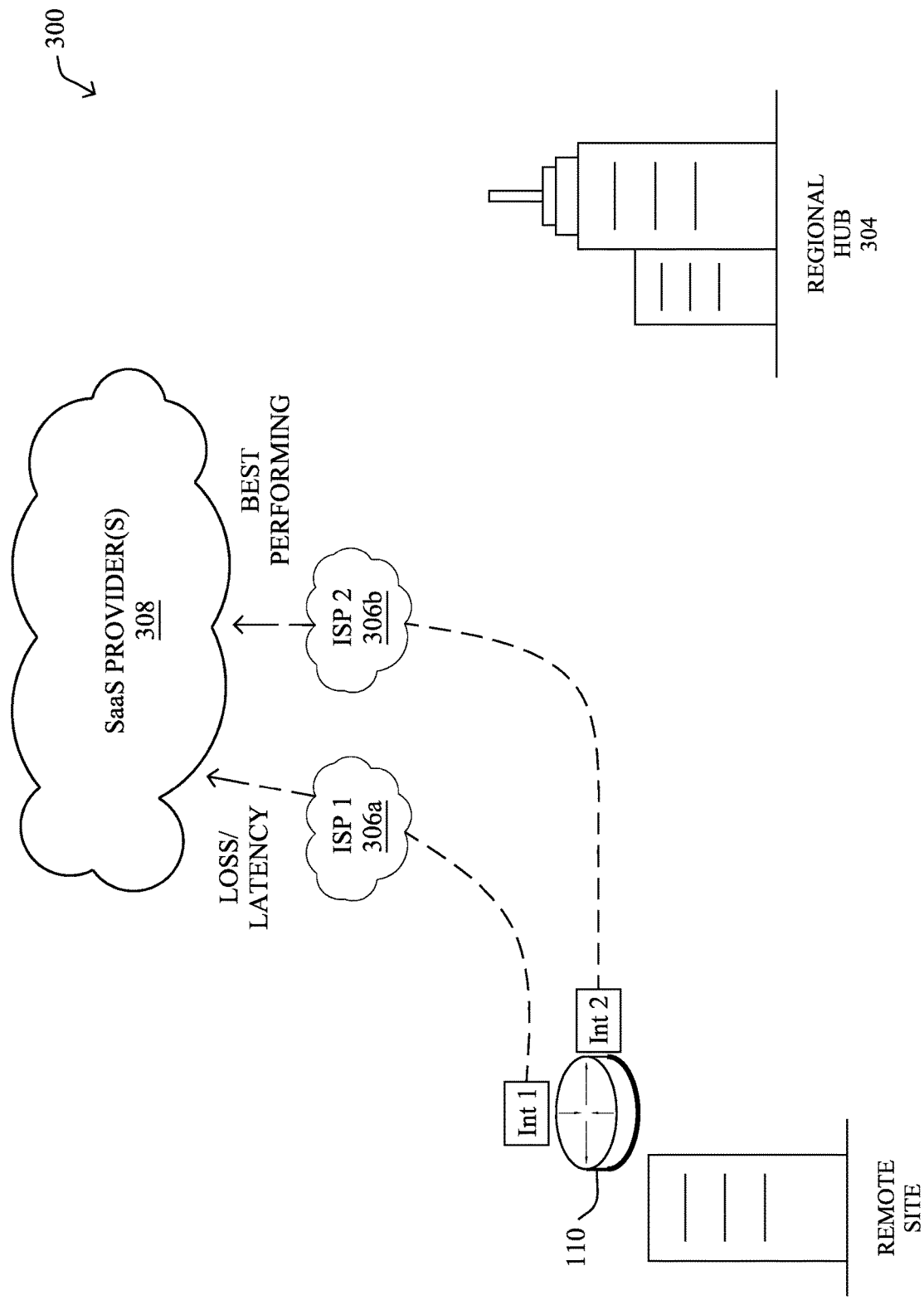
FIGS. 3A-3B illustrate example network deployments.
Figure 3B:
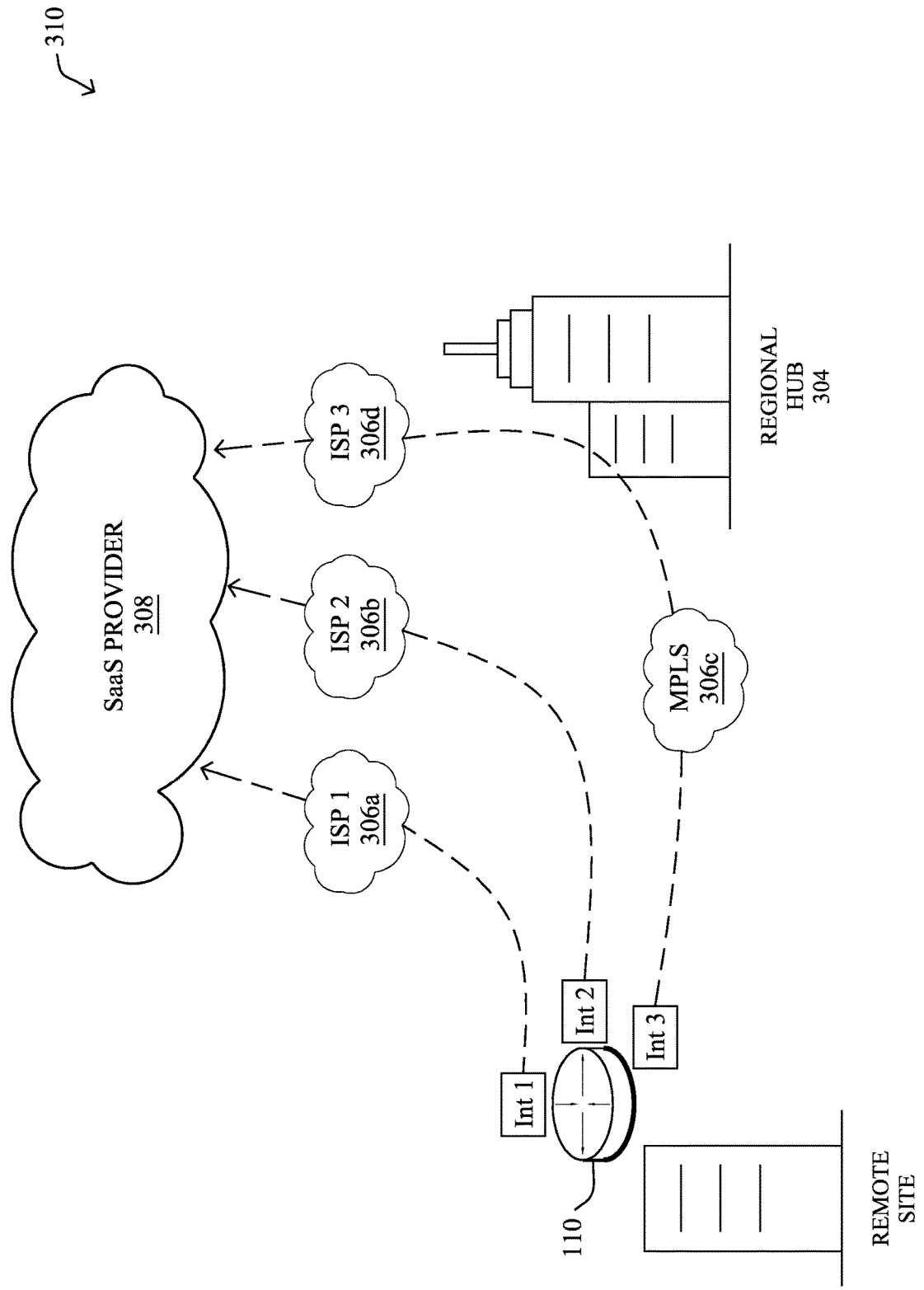

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
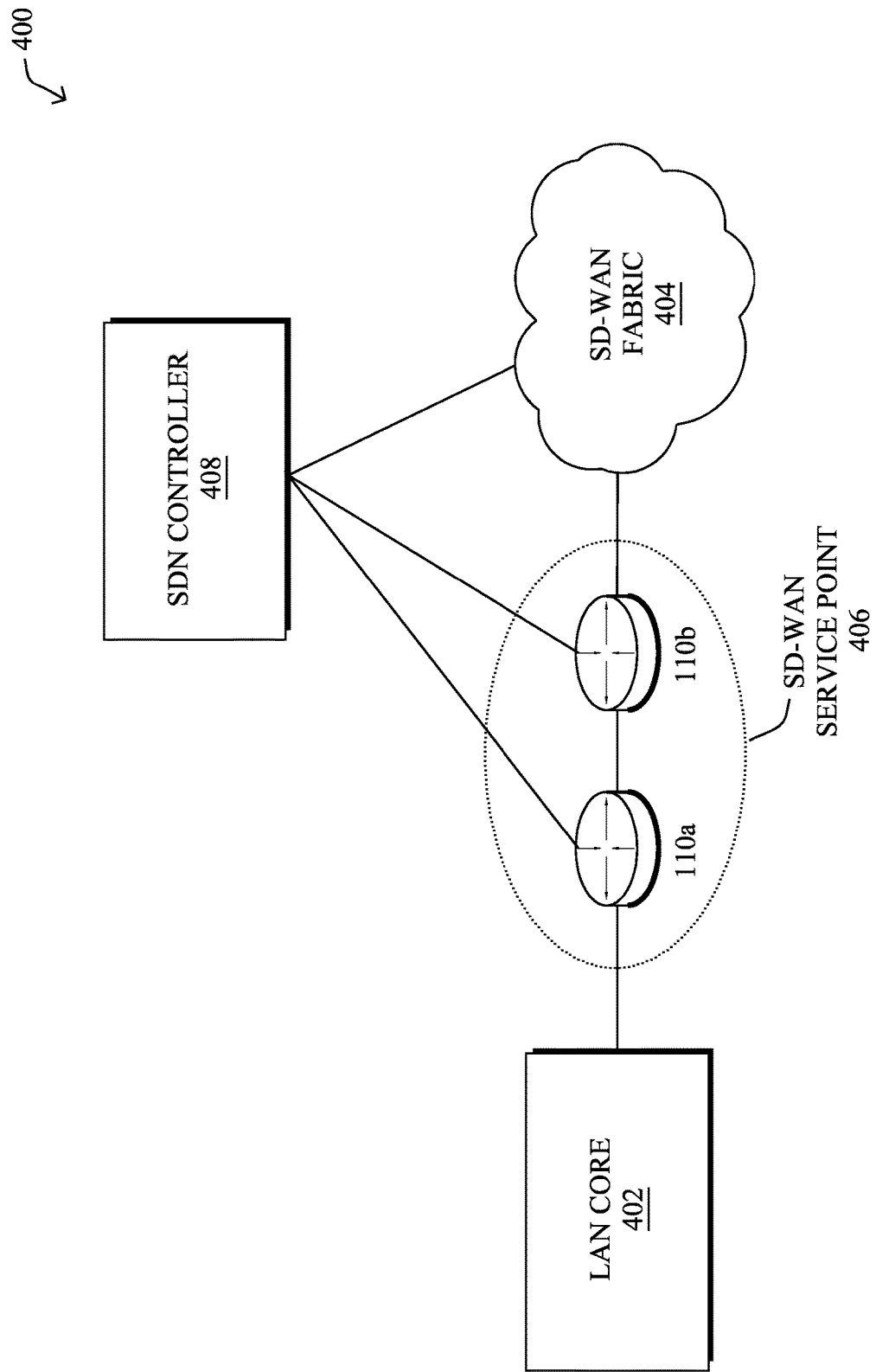
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS. LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPE, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (IMP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.
Routing is still entirely reactive: decisions are made using probes that reflect the status of a path at a given time, in contrast with the notion of an informed decision.
SLA failures are very common in the Internet and a good proportion of them could be avoided (e.g., using an alternate path), if predicted in advance.

Figure 4B:
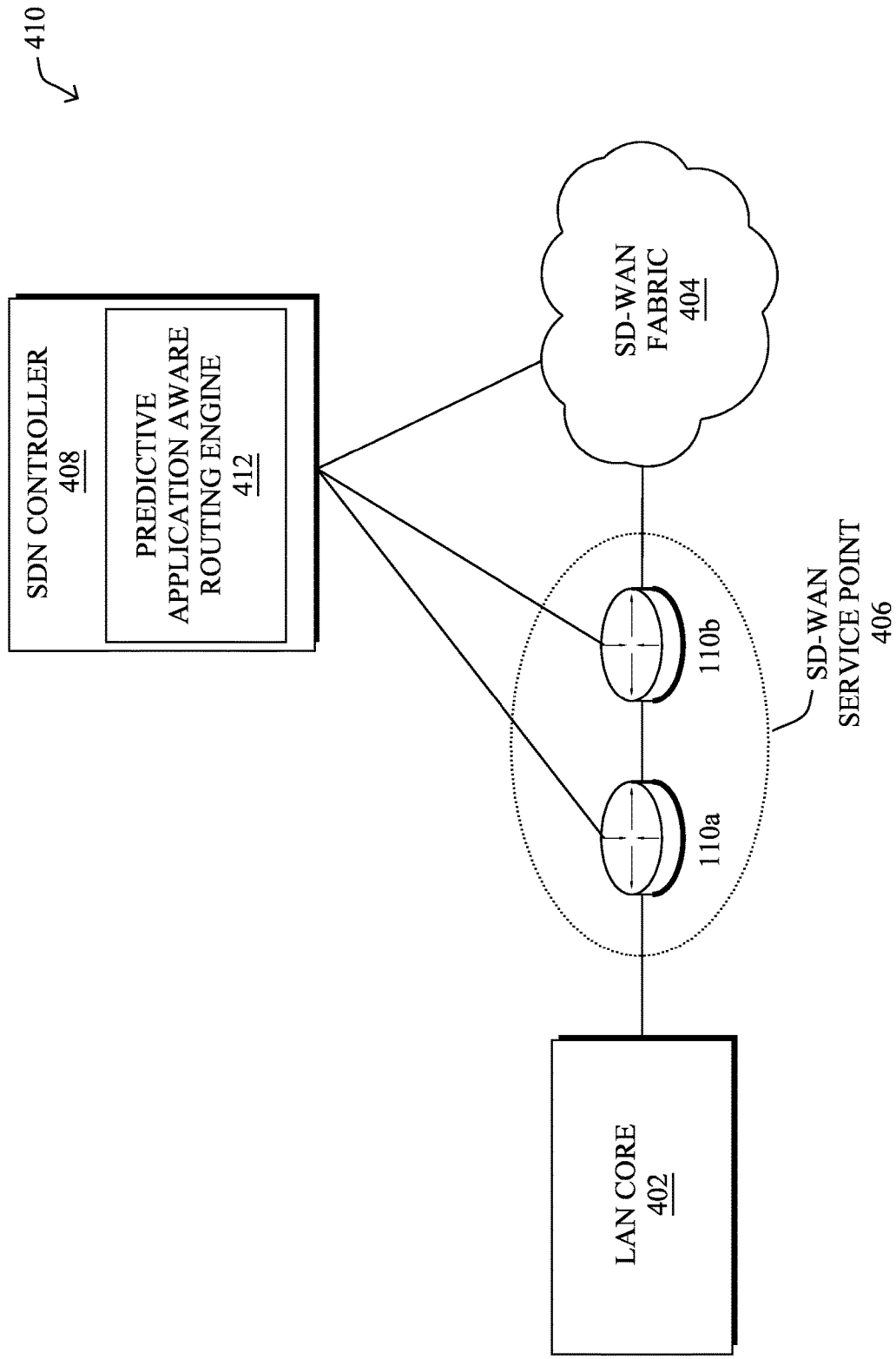

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 244 and/or predictive modeling process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

As noted above, solutions today with centralized/distributed routing do not have knowledge of the expected experience along a given path comprising a variety of links, except for the routing cost that is inherently static. At some point, some proposals have been made, and even implemented, consisting in making the routing cost (metrics) dynamic, such as the TOP link cost reflecting the status of the queueing delays. Unfortunately, such proposals have been abandoned for a number of reasons such as the lack of stability (leading to routing oscillations). Other approaches, such as BOP Link State (BGP-LS), allow for advertising highly summarized characteristics of intra-domain path characteristics. Other approaches, such as MPLS Inter-domain, rely on inter-path computation engine (PCE) communication reflecting a summarized state of path within a domain. Still, all these approaches are based on (semi)-static link/path characteristic with a very low granularity reflecting the present state of a link/path.

Replacing Static Routing Metrics with Probabilistic Models

The techniques introduced herein propose encoding prior knowledge about a link/path into a predictive model (e.g., a statistical or machine learning-based model), which can be used as an attribute for that link/path when computing a shortest routing path in a network. Such an approach differs significantly from traditional route computation approaches (e.g., ISIS, OSPF, BOP, etc.) where routing decisions are based solely on instantaneous network (link) states reflected in routing metrics.

Illustratively, the techniques described herein may be performed by hardware, software, and/or firmware, such as in accordance with predictive modeling process 248, which may include computer executable instructions executed by the processor 220 (or independent processor of interfaces 210) to perform functions relating to the techniques described herein (e.g., in conjunction with routing process 244).

Specifically, according to various embodiments, a device obtains a predictive model that predicts a behavior of a path in a network. The device computes, based in part on the predictive model, a route in the network that includes the path, in accordance with a routing policy that instructs the device to use the predictive model as an attribute of the path during computation of the route. The device validates that the path exhibited the behavior predicted by the predictive model. The device initiates retraining of the predictive model, when the behavior predicted by the predictive model does not match the behavior of the path.

Figure 5:
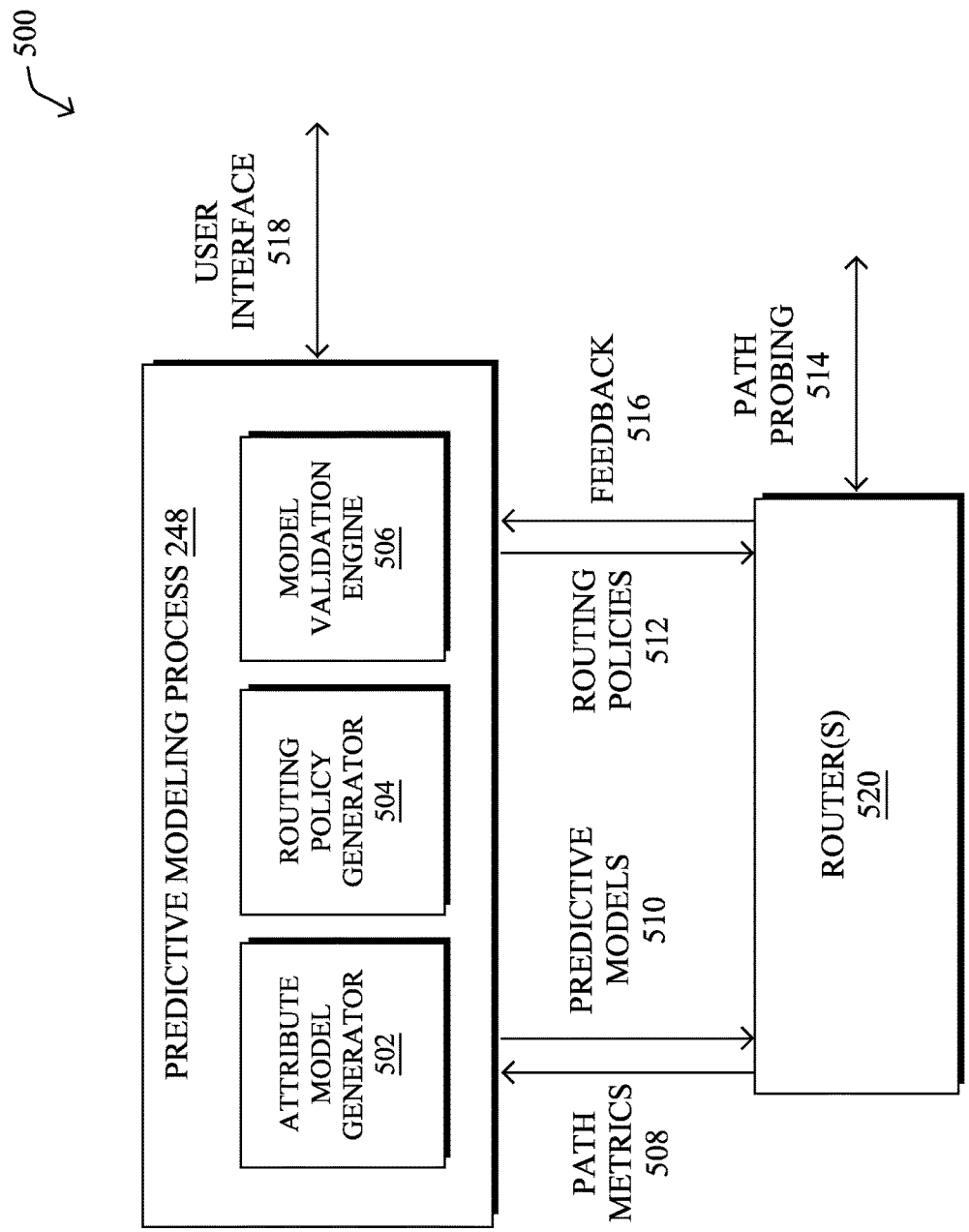
FIG. 5 illustrates an example architecture for replacing static routing metrics with probabilistic models.

Operationally, FIG. 5 illustrates an example architecture 500 architecture for replacing static routing metrics with probabilistic models, according to various embodiments. At the core of architecture 500 is predictive modeling process 248, which may be executed by a supervisory device of a network or another device in is communication therewith. For instance, predictive modeling process 248 may be executed by an SDN controller (e.g., SDN controller 408 in FIGS. 4A-4B), a particular networking device in the network (e.g., a router, etc.), or another device in communication therewith. In other instances, predictive modeling process 248 may be executed in whole, or in part, by a networking device in the network, such as a border router, etc.

As shown, predictive modeling process 248 may include any or all of the following components: an attribute model generator 502, a routing policy generator 504, and/or a model validation engine 506. As would be appreciated, the functionalities of these components may be combined or omitted, as desired. In addition, these components may be implemented on a singular device or in a distributed manner, in which case the combination of executing devices can be viewed as their own singular device for purposes of executing predictive modeling process 248.

According to various embodiments, during execution, attribute model generator 502 may generate predictive models for any or all links/paths in the network. In general, the predictive model may take the form of a statistical or machine learning-based model that predicts the expected behavior of the link/path. Today, a link/path may have one or more static metrics (e.g., IGP metrics, traffic engineering metrics, etc.), used to represent a given property/attribute of that link/path. For example, routing metrics may be bandwidth or reliability metrics (e.g., ETX for lossy link in IoT). Sometimes, compound metrics are used in the form of a polynomial formula reflecting multiple characteristics (e.g., bandwidth, delay, etc.) of the link/path. For simplicity, the term "path" is used henceforth to refer to a single link or a combination of links in the network between networking devices. Generally speaking, attribute model generator 502 may construct a predictive model based on path metrics 508 for that path, such as those that may be collected by routers) 520 via path probing 514, inferring metrics, etc.

In one embodiment, the primary model is a generative model for each QoS. For example, the latency on a path p can be specified as follows:

$$\text{latency}_p \sim N(\mu_p, \sigma_p^2)$$

or as a Gaussian Mixture Model (GMM) as follows:

$$\text{latency}_p = GMM((w_1, \mu_1, \sigma_1^2), \ldots, (w_k, \mu_k, \sigma_k^2))$$

which is a model with k Gaussian components and each component i has a weight of $w_i$, mean of $\mu_i$, and a variance of $\sigma_i^2$.

Similarly, in further embodiments, loss can be represented as a beta distribution as follows:

$$\text{latency}_p \sim Beta(\alpha_p, \beta_p).$$

Note that such models can be used to derive the probability of an SLA violation. For example, in the case of traffic for a voice application, the ITU G.144 recommends voice calls to have a one-way latency of less than 200 ms. Using the above model, it is straightforward to compute the probability of breaking eh SLA directly form this distribution.

In other embodiments, the model may take as input a set of features (e.g., time of day, day of week, amount of traffic per traffic types, QoS strategy, link clock, past behaviors, . . . ) and may be retrained regularly over time as new data/path metrics 508 become available. One or more predictive models may also be used to regress multiple link properties, and a classification model that produces a binary decision (e.g., whether there will be an SLA violation) can also be used.

Independent of the nature of the predictive models generated by attribute model generator 502, there may be one model specified for each application and a default model. For example, a model that regresses (voice) SLA violation probability can be used for all voice calls, and a model that regresses to optimize bandwidth can be used for file transfer and mail applications. A default model may also be specified, such as via input from a user interface 518.

According to various embodiments, a key idea herein is that a predictive model 510 generated by attribute model generator 502 to predict the behavior of a particular path can be used as another attribute during the computation of a route in the network. For instance, assume that predictive model 510 comprises a simple Probability Density Function (PDF) or a regression function that predicts a characteristic of a link/path, such as the expected probability of that link/path violating an SLA given some current context (e.g., time, internal router metrics, traffic type, etc.).

There are multiple modes of operation in which the techniques herein could be used:

Centralized versus distributed model computation: As pointed out, a new attribute is assigned to links in the network in the form of a predictive model. Such a model may be computed by a central agent, in some instances. For example, attribute model generator 502 may be computed by an SDN controller or other centralized service. This is particularly useful in cases in which a variety of inputs are needed and/or the model relies on machine learning. Alternatively, attribute model generator 502 may be executed by router(s) 520, to generate more simplistic predictive models (e.g., statistical models) for their directly connected links. For instance, a particular router 520 may compute the PDF for a delay metric for one of its links, based on the past experiences of that link.

Centralized versus distributed model distribution: When predictive models 510 are generated in a centralized manner, they may be distributed to their destination router(s) 520 using a custom IPv4 or IPv6 message. Conversely, when routers 520 compute the predictive models for their links, locally, they may disseminate these predictive models to other routers using the routing protocol in use (e.g., IGP or BGP). In the case of OSPF, this dissemination may entail including the predictive model 510 in a new Link State Advertisement (LSA) type-length-value (TLV). Similarly, a TLV could be used to convey the predictive model when IS-IS is used, to reflect the new link attribute.

Centralized versus distributed path computation: As noted, a key aspect herein is the use of a predictive model as part of the attribute(s) considered when computing a routing path in the network. Centralized path computation may be used in specific cases, such as inter-domain paths across multiple Autonomous Systems (AS) or when the computation of path made of a high number of: links each having complex performance models is too CPU intensive. Conversely, when a statistical distributed approach is taken, then the computation of the shortest (constrained) path may be performed by each router 520 using an extended Link State Data. Base (LSDB). For example, in a fully distributed environment, each router 520 may be responsible for computing the (constrained) shortest path between itself and each other node within the routing domain using link metrics. Suppose that each link metric makes use of a PDF for delay. In such a case, Dijkstra's algorithm may be modified so as to recompute the new metric (e.g., the PDF for delay, etc.), when computing the shortest path tree (SPT) from which the route is selected. Assuming that the densities or probability mass functions for the path metric on two edges are denoted by X and Y, the density Z of the sum of the metric values over the two edges when the probability distributions are independent can be computed using the convolution operator. For instance, for an integer metric, the sum has probability mass function:

$$P(Z=z) = \sum_{k=-\infty}^{\infty} P(X=k)P(Y=z-k)$$

In practice, distributions often have finite support, and can be computed efficiently. In further embodiments, empirical distributions can be approximated by histograms, to limit the amount of memory and network bandwidth used to store and exchange their representation. Although the distributions on neighboring edges might not be independent, this can still be used as an approximation.

A working prototype was constructed, to demonstrate the efficacy of the techniques herein. In the prototype, a machine learning-based model was computed, to compute the probability of an SLA failure along a path. This model was computed in a centralized manner and the best routing path was also computed in a centralized manner. In general, the prototype consisted of a forecasting engine (FE) an attribute model generator) and a control engine (CE). For each path in a network the FE trained a machine learning predictive model, based on the historical QoS metrics for that path over several months. In turn, the models were used for the next few weeks to predict the expected QoS for each path, making predictions once per day, or more frequently (e.g., every few hours). After four weeks, the FE was executed again using a new training dataset, again leveraging metrics obtained over the prior few months and retrained a new set of predictive models for each path. This behavior has been simulated and evaluated by making out-of-sample simulated historical predictions in a back-test, which includes regular retraining of the models every for weeks. Note that this approach is often called a walk forward back test and is a common technique to test forecasting models. One embodiment of the FE focuses on predicting the expected violation probability of a static SLA template, which may apply to voice and video traffic: one-way delay <150 ms, jitter <50 ms, loss percentage <3%. From the historical training data, the FE learned both the current baseline SLA violation probability for each path and also the amounts and periods of seasonal patterns in the violation probability exhibited in the recent past on that path.

Figure 6:
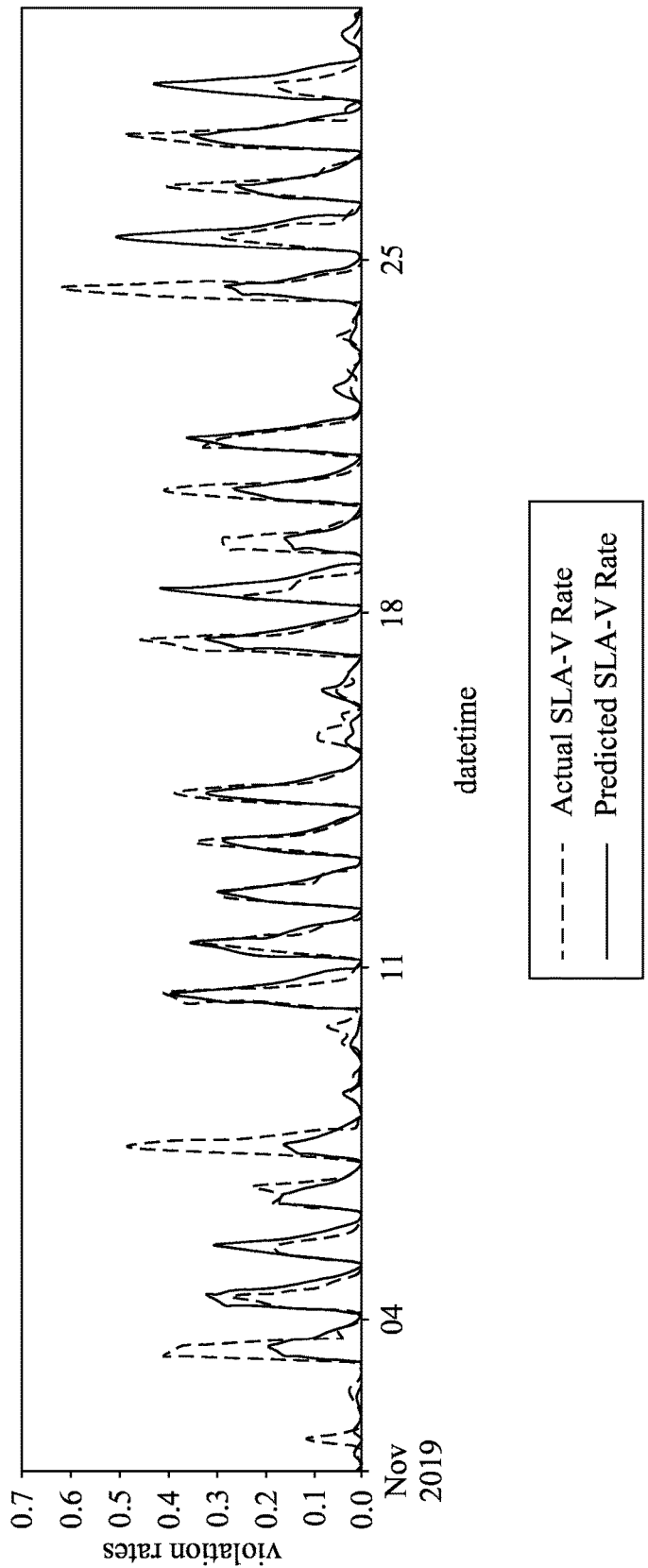
FIG. 6 illustrates an example plot of actual versus predicted service level agreement (SLA) violations.

FIG. 6 illustrates a plot 600 of actual vs. predicted SLA violations observed using the protype for one path in an SD-WAN. The predictive model was trained on data collected from August-September 2019, and then used to make predictions for each day in November 2019, based on input features calculated from the QoS metrics over the previous days. In this example, the FE has learned from the training dataset that the SLA-violation rates on this path follow a strong, weekly seasonal pattern, Here the predictive model is able to predict SLA rate violations that match the true, out-of-sample (i.e., not seen by the FE) SLA-violation rates quite well.

Referring again to FIG. 5, another aspect of the techniques herein relates to the specification of the routing policy to the router(s) 520 or centralized path computation device. To this end, predictive modeling process 248 may also include routing policy generator 504 that is configured to generate and push routing policies 512 to router(s) 520. For instance, in SDNs, controllers are typically used to manage configurations and performance related statistics.

According to various embodiments, routing policies 512 may include a new routing policy that instructs router(s) 520 to use predictive models 510 as path attributes to consider when computing routes in the network. With such an approach, this allows router(s) 520 or other device computing the routing paths to select next-best-hops using predictive models 510 according to a given objective function. This is in contrast to static metric-based routing strategy, which could be specified by other routing policies 512, where preferred paths are based on user preference, and static shortest paths, and followed by SLA checking after routing traffic onto that route.

In some embodiments, routing policies 512 may specify that the predictive approach should be used by default, followed by a secondary option that may rely on static metrics. For instance, such a secondary option may be utilized when a predictive model 510 does not exist for a given path or the predictive models 510 are considered untrustworthy, as detailed below. With such an approach, the preferred next-hop may also be computed using a predictive model 510 corresponding to a per-application routing policy. For example, a user may specify via user interface 518 that the objective function for voice traffic for voice traffic consists in selecting the preferred path such that the probability of violating the voice SLA template is minimized.

By way of illustration, consider the case of voice traffic being conveyed via the network. One implementation of the techniques herein may entail adopting a distributed probabilistic routing approach across the network only for voice traffic, whereas other traffic type may still be using static IGP metrics. Each router 520 could then compute statistical models reflecting the delay/loss models for their directly connected links and use an extended shortest path first (SPF) approach to compute the shortest probabilistic path for voice, whereas a more traditional approach could be used for other traffic type.

A further aspect of the techniques herein introduces a control plane paradigm for network using the above predictive approach. In current SD-WAN solutions, the path selection is performed by each edge router 520, according to a predefined (static) policy. In the absence of SLA policies (traditional routing), no rerouting event takes place unless connectivity is lost altogether. With probe-based SLA checking, which is the current approach taken in SD-WANs, routing decision are re-evaluated after the expiration of the probing period. For instance, routers 520 may perform path probing 514 every hour, to check whether the current routing path meets the SLA of its traffic. If not, that route may be flagged as ineligible and the traffic may be re-routed onto another route.

In contrast, the techniques herein leverage predictive models to predict the expected SLA along a set of paths and the best outcome (e.g., a higher probability of SLA compliance, higher than expected throughput values, etc.) to drive the route selection. Here, routers 520 may still leverage path probing 514 to verify/validate whether the probabilistic routing decision is indeed accurate. Such path probing 514 may be explicit (e.g., by sending RFD probes along the path) and/or implicit (e.g., using traffic acknowledgement packets to compute the application experience). In turn, the resulting probing statistics could be provided back to predictive modeling process 248 as feedback 516. Note that feedback 516 could be used locally by the router(s) 520 and/or by the centralized device executing predictive modeling process 248 in charge of generating predictive model 510.

As shown, model validation engine 506, executed locally by router(s) 520 or by the central controller, may assess 516, to validate that a particular path exhibited the behavior predicted by its predictive model 510. For instance, in the case of the predictive model 510 predicting SLA violations, model validation engine 506 may assess the accuracy of these predictions. In turn, model validation engine 506 may assign a trust score that represents this accuracy to the predictive model 510. Such a trust score may be used, for instance, by a user of user interface 518 to enable the prediction-based routing policy if and only if the trust score is greater than a predefined threshold.

In further embodiments, the trust score for a particular predictive model 510 may also be used by model validation engine 506 to initiate retraining of that model, such as when the trust score is below a particular threshold, To this end, model validation engine 506 may signal to attribute model generator 502 and/or router(s) 520 that model retraining is needed. Note that such a round of retraining may also require the collection of additional path metrics 508 (e.g., via path probing 514, additional NetFlow records, various types of outputs, etc.) for consumption by attribute model generator 502.

In yet another embodiment, a router 520 may decide to override the routing decision at any given time, in order to keep checking the validity of predictive models 510. Indeed, if a link is not used sufficiently often, its associated predictive model 510 used to evaluate its performance may quickly become outdated.

A further aspect of the techniques herein relates to the computation of the routing table. Indeed, in contrast with existing solutions where Routing Tables/Routing Information Base (RIB) are only recomputed upon receiving a routing update reporting a change or when SLA are no longer met, such RIB may be re-evaluated upon the expiration of a configurable timer, when the trust score starts to deviate or falls below a given value. In another embodiment, routing computation (using inference of the predictive model 510) may vary with the level of criticality of the application. The use of a predictive routing policy may also be re-evaluated by model validation engine 506 more often for critical applications. In another embodiment, such re-evaluation may be driven by the value difference between the path in use and the other path being considered. If the probability of meeting the SLA between the preferred (in use) path is x % higher than all other paths, then the re-evaluation may be less frequent. In addition, if the computation of the RIB is distributed (e.g., made by each edge router 520), then shortest path computation no longer relies Ern Dijkstra's algorithm but on the use of predictive models 510 from edge router to destination.

With respect to model retraining based on feedback 516, attribute model generator 502 may also retrain predictive models 510 at regular intervals, as well, regardless of their performance. In practice, it is valuable (for the sake of cost and scalability) to adjust the rate at which a given model NI is trained in an inverse proportion to its accuracy and/or performance. A predictive model 510 that is very reliable does not need to be retrained so regularly, whereas a model that performs poorly could benefit from more recent data. This is particularly important in case the dynamics of the path recently changed, in which case a retraining can help the model adapt to the new situation. Other training strategies can include collecting more training data and/or switching more complex models (e.g., deeper neural networks or trees) when performance is poor.

Figure 7:
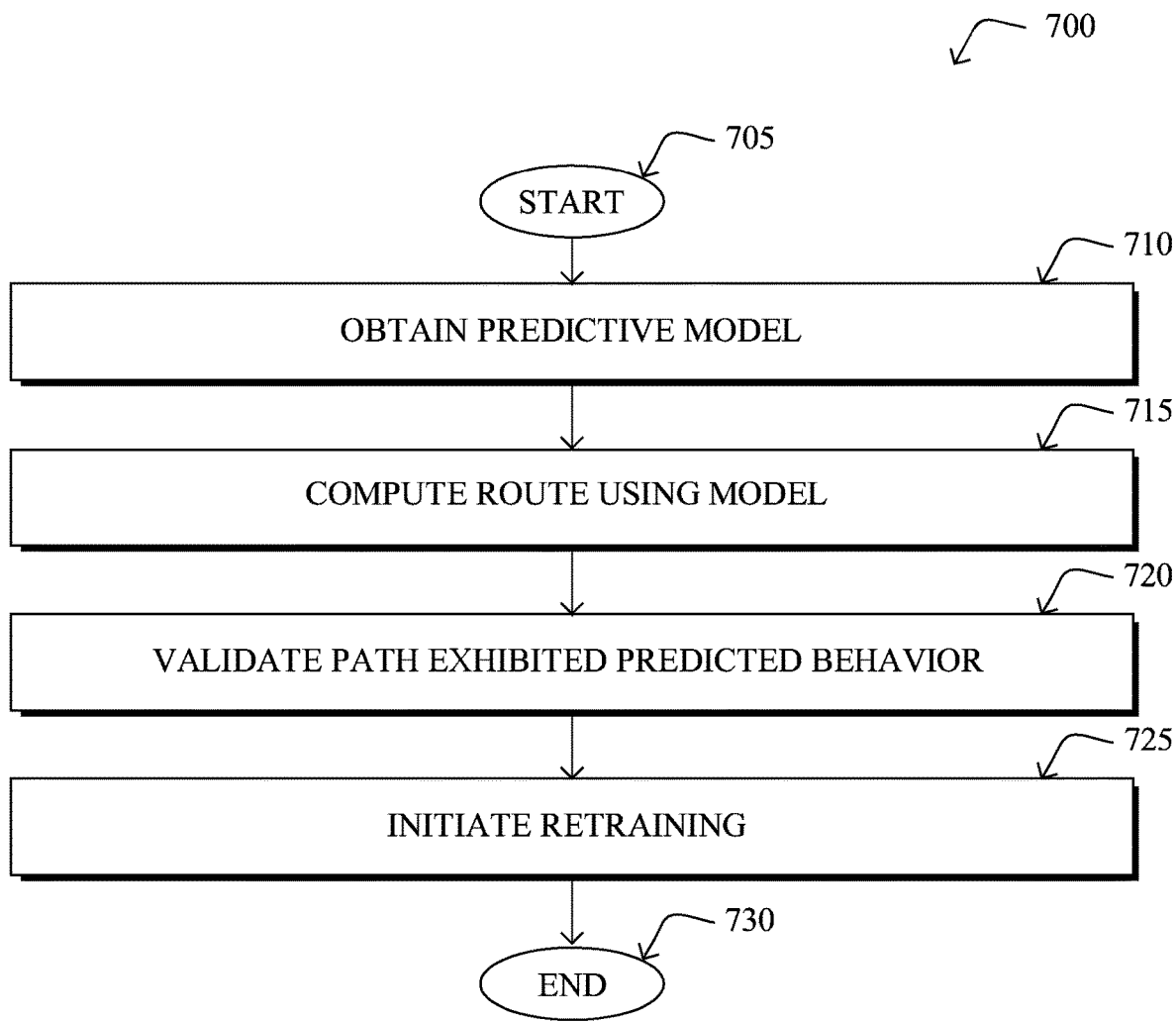
FIG. 7 illustrates an example simplified procedure for replacing static routing metrics with probabilistic models.

FIG. 7 illustrates an example simplified procedure for replacing static routing metrics with probabilistic models, in accordance with one or more embodiments described herein. For example, a non-generic, specifically configured device (e.g., device 200), such as a networking device (e.g., a router, an SDN controller for an SD-WAN, etc.), or a device in communication therewith, may perform procedure 700 by executing stored instructions (e.g., predictive modeling process 248 and/or routing process 244). The procedure 700 may start at step 705, and continues to step 710, where, as described in greater detail above, the device may obtain a predictive model that predicts a behavior of a path in a network. For instance, in some instances, the device may generate the model, based on path metrics for the path or receive the model from another device that computes the model. In various embodiments, the model may be sent via the network as an Open Shortest Path First (OSPF) link state advertisement (LSA) or an Intermediate System to Intermediate System (IS-IS) type-length-value (TLV).

At step 715, as detailed above, the device may compute, based in part on the predictive model, a route in the network that includes the path, in accordance with a routing policy that instructs the device to use the predictive model as an attribute of the path during computation of the route. In other words, the device may be instructed by policy to consider the predicted behavior of the path, when computing a route in the network. As would be appreciated, other routing policies may instruct the device to compute a route using static path metrics for the path, instead of the predictive model. For instance, the device may be instructed to only rely on the predictive model when computing routes for a particular type of traffic (e.g., voice, etc.).

At step 720, the device may validate that the path exhibited the behavior predicted by the predictive model, as described in greater detail above. For instance, in the case of the predictive model predicting whether the path will violate a traffic SLA, this validation may entail comparing the actual performance of the path to that of its predicted performance. In some cases, the validation may also entail actively probing the path (e.g., by sending probes along the path) and/or passively probing the path (e.g., based on ACKs, etc.).

At step 725, as detailed above, the device may initiate retraining of the predictive model, when the behavior of the predictive model does not match the behavior of the path. For instance, the device may assign a trust score to the predictive model based on a comparison between the behavior predicted by the predictive model and the behavior of the path. If such a trust score is below a threshold, the device may initiate retraining of the model. In further embodiments, the device may also initiate retraining of the model periodically or on demand, so as to ensure that the model reflects the most current conditions of the network. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for routing decisions to be made using predictions from probabilistic models, as opposed to static metrics. Doing so allows a control engine or route computation mechanism to make much more robust and suitable routing decisions.

While there have been shown and described illustrative embodiments that provide for using probabilistic/predictive models for purposes of computing routing paths in a network, it is to be understood that various other adaptations and modifications may be is made within the spirit and scope of the embodiments herein. For example, while certain embodiments are described herein with respect to using certain models for purposes of predicting SLA violations, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
    obtaining, by a device, a predictive model that predicts a behavior of a path in a network;
    computing, by the device and based in part on the predictive model, a route in the network that includes the path, in accordance with a routing policy that instructs the device to use the predictive model as an attribute of the path during computation of the route and to use the predictive model only when computing routes for a particular type of traffic;
    computing, by the device, another route in the network for a type of traffic other than the particular type of traffic, in accordance with a second routing policy that instructs the device to use static path metrics for the path instead of the predictive model during this computation;
    validating, by the device, that the path exhibited the behavior predicted by the predictive model; and
    initiating, by the device, retraining of the predictive model, when the behavior predicted by the predictive model does not match the behavior of the path.

2. The method as in claim 1, wherein the network comprises a software-defined wide area network.

3. The method as in claim 1, wherein the behavior of the path predicted by the predictive model is indicative of whether the path will violate a service level agreement (SLA) for traffic to be routed via the path, and wherein validating that the path exhibited the behavior predicted by the predictive model comprises:
    determining whether the path violated the SLA as predicted by the predictive model based on information indicative of an actual performance of the path.

4. The method as in claim 1, wherein validating that the path exhibited the behavior predicted by the predictive model comprises:
    sending probes along the route, to collect probing statistics.

5. The method as in claim 1, wherein validating that the path exhibited the behavior predicted by the predictive model comprises:
    assigning a trust score to the predictive model based on a comparison between the behavior predicted by the predictive model and the behavior of the path.

6. The method as in claim 1, wherein the predictive model is sent via the network as an Open Shortest Path First (OSPF) link state advertisement (LSA) or an Intermediate System to Intermediate System (IS-IS) type-length-value (TLV).

7. The method as in claim 1, wherein computing the route in the network that includes the path comprises:
    overriding a routing decision to use a different routing path, to test validity of the predictive model.

8. The method as in claim 1, wherein the device comprises a router at an edge of the network.

9. An apparatus, comprising:
    one or more network interfaces;
    a processor coupled to the one or more network interfaces and configured to execute one or more processes; and
    a memory configured to store a process that is executable by the processor, the process when executed configured to:
        obtain a predictive model that predicts a behavior of a path in a network;
        compute, based in part on the predictive model, a route in the network that includes the path, in accordance with a routing policy that instructs the apparatus to use the predictive model as an attribute of the path during computation of the route and to use the predictive model only when computing routes for a particular type of traffic;
        compute another route in the network for a type of traffic other than the particular type of traffic, in accordance with a second routing policy that instructs the device to use static path metrics for the path instead of the predictive model during this computation;
        validate that the path exhibited the behavior predicted by the predictive model; and
        initiate retraining of the predictive model, when the behavior predicted by the predictive model does not match the behavior of the path.

10. The apparatus as in claim 9, wherein the network comprises a software-defined wide area network.

11. The apparatus as in claim 9, wherein the behavior of the path predicted by the predictive model is indicative of whether the path will violate a service level agreement (SLA) for traffic to be routed via the path, and wherein the apparatus validates that the path exhibited the behavior predicted by the predictive model by:
    determining whether the path violated the SLA as predicted by the predictive model based on information indicative of an actual performance of the path.

12. The apparatus as in claim 9, wherein the apparatus validates that the path exhibited the behavior predicted by the predictive model by:

sending probes along the route, to collect probing statistics.

13. The apparatus as in claim 9, wherein the apparatus validates that the path exhibited the behavior predicted by the predictive model by:
   assigning a trust score to the predictive model based on a comparison between the behavior predicted by the predictive model and the behavior of the path.

14. The apparatus as in claim 9, wherein the predictive model is sent via the network as an Open Shortest Path First (OSPF) link state advertisement (LSA) or an Intermediate System to Intermediate System (IS-IS) type-length-value (TLV).

15. The apparatus as in claim 9, wherein the apparatus computes the route in the network that includes the path by:
   overriding a routing decision to use a different routing path, to test validity of the predictive model.

16. A tangible, non-transitory, computer-readable medium storing program instructions that cause a device to execute a process comprising:
   obtaining, by the device, a predictive model that predicts a behavior of a path in a network;
   computing, by the device and based in part on the predictive model, a route in the network that includes the path, in accordance with a routing policy that instructs the device to use the predictive model as an attribute of the path during computation of the route and to use the predictive model only when computing routes for a particular type of traffic;
   computing, by the device, another route in the network for a type of traffic other than the particular type of traffic, in accordance with a second routing policy that instructs the device to use static path metrics for the path instead of the predictive model during this computation;
   validating, by the device, that the path exhibited the behavior predicted by the predictive model; and
   initiating, by the device, retraining of the predictive model, when the behavior predicted by the predictive model does not match the behavior of the path.

* * * * *

UNITED STATES PATENT AND TRADEMARK OFFICE
CERTIFICATE OF CORRECTION

| | |
|---|---|
| PATENT NO. | : 11,533,252 B2 |
| APPLICATION NO. | : 17/181471 |
| DATED | : December 20, 2022 |
| INVENTOR(S) | : Jean-Philippe Vasseur |

It is certified that error appears in the above-identified patent and that said Letters Patent is hereby corrected as shown below:

In the Specification

Column 8, Line 62, please amend as shown:
Internet, MPLS. LTE transports providing highly varying Column 9, Line 9, please amend as shown:
routing protocols (ISIS, OSPF, etc.) using various metrics Column 9, Line 28, please amend as shown:
QoE by sending Hyper Text Transfer Protocol (HTTP) probes Column 10, Line 21, please amend as shown:
dynamic, such as the IGP link cost reflecting the status of Column 10, Line 25, please amend as shown:
such as BGP Link State (BGP-LS), allow for advertising Column 10, Line 43, please amend as shown:
(e.g., ISIS, OSPF, BGP, etc.) where routing decisions are Column 11, Line 3, please amend as shown:
network or another device in communication therewith.

Column 11, Line 39, please amend as shown:
for that path, such as those that may be collected by router(s)

Column 11, Line 61, please amend as shown:
probability of breaking the SLA directly from this distribu- Signed and Sealed this
Twenty-eighth Day of March, 2023

Katherine Kelly Vidal
*Director of the United States Patent and Trademark Office*

CERTIFICATE OF CORRECTION (continued)
U.S. Pat. No. 11,533,252 B2

Column 12, Line 60, please amend as shown:
high number of links each having complex perfor- Column 12, Line 65, please amend as shown:
State Data Base (LSDB). For example, in a fully Column 13, Line 35, please amend as shown:
prototype consisted of a forecasting engine (FE) (e.g. an attribute Column 13, Line 67, please amend as shown:
strong, weekly seasonal pattern. Here the predictive model Column 15, Line 2, please amend as shown:
may be explicit (e.g., by sending BFD probes along the path Column 15, Line 25, please amend as shown:
the trust score is below a particular threshold. To this end, Column 15, Line 59, please amend as shown:
relies on Dijkstra's algorithm but on the use of predictive Column 15, Line 65, please amend as shown:
and scalability) to adjust the rate at which a given model M Column 17, Line 13, please amend as shown:
and modifications may be made within the spirit and scope